US008849359B2

(12) United States Patent
Whattam

(10) Patent No.: US 8,849,359 B2
(45) **Date of Patent: *Sep. 30, 2014**

(54) ADVANCED ALERT, NOTIFICATION, AND RESPONSE DEVICE

(76) Inventor: Jeff Whattam, Lexington, KY (US)

( * ) Notice: Subject to any disclaimer, the term of this patent is extended or adjusted under 35 U.S.C. 154(b) by 662 days.

This patent is subject to a terminal disclaimer.

(21) Appl. No.: 13/155,083

(22) Filed: Jun. 7, 2011

(65) Prior Publication Data

US 2011/0234394 A1 Sep. 29, 2011

Related U.S. Application Data

(62) Division of application No. 12/090,393, filed as application No. PCT/US2005/037659 on Oct. 18, 2005, now Pat. No. 7,979,094.

(51) Int. Cl.
*H04M 1/00* (2006.01)

(52) U.S. Cl.
USPC .............................................. 455/567; 379/45

(58) Field of Classification Search
None
See application file for complete search history.

(56) References Cited

U.S. PATENT DOCUMENTS

| | | | | |
|---|---|---|---|---|
| 6,526,268 | B1 | 2/2003 | Marrah et al. | |
| 6,617,964 | B1 * | 9/2003 | Lamb | 340/286.02 |
| 6,816,878 | B1 * | 11/2004 | Zimmers et al. | 709/200 |
| 6,867,688 | B2 * | 3/2005 | Lamb | 340/286.02 |
| 6,868,688 | B2 * | 3/2005 | Narehood | 312/405 |
| 2003/0121036 | A1 | 6/2003 | Lock et al. | |
| 2003/0143974 | A1 | 7/2003 | Navarro | |
| 2004/0048573 | A1 | 3/2004 | Clark | |
| 2004/0070515 | A1 * | 4/2004 | Burkley et al. | 340/825.49 |
| 2004/0152493 | A1 * | 8/2004 | Phillips et al. | 455/567 |
| 2005/0013417 | A1 | 1/2005 | Zimmers et al. | |
| 2005/0057372 | A1 | 3/2005 | Taylor | |
| 2005/0085257 | A1 | 4/2005 | Laird et al. | |
| 2005/0162267 | A1 | 7/2005 | Khandelwal et al. | |
| 2005/0166221 | A1 | 7/2005 | Pugel et al. | |

* cited by examiner

*Primary Examiner* — Maria El-Zoobi
(74) *Attorney, Agent, or Firm* — Fish & Tsang LLP

(57) ABSTRACT

Contemplated devices and methods employ a system in which at least two receivers are configured to receive at the same time a first and a second emergency signal via a first and a second communication pathway, respectively. The device further has a control unit that is programmed to assign priority to one channel of one communication pathway over at least one channel of the other communication pathway, wherein priority assignment is performed on the basis of geographic location and a set of predefined rules. Most preferably, the location of the device is automatically determined using global positioning signals and/or digital television signals.

16 Claims, 1 Drawing Sheet

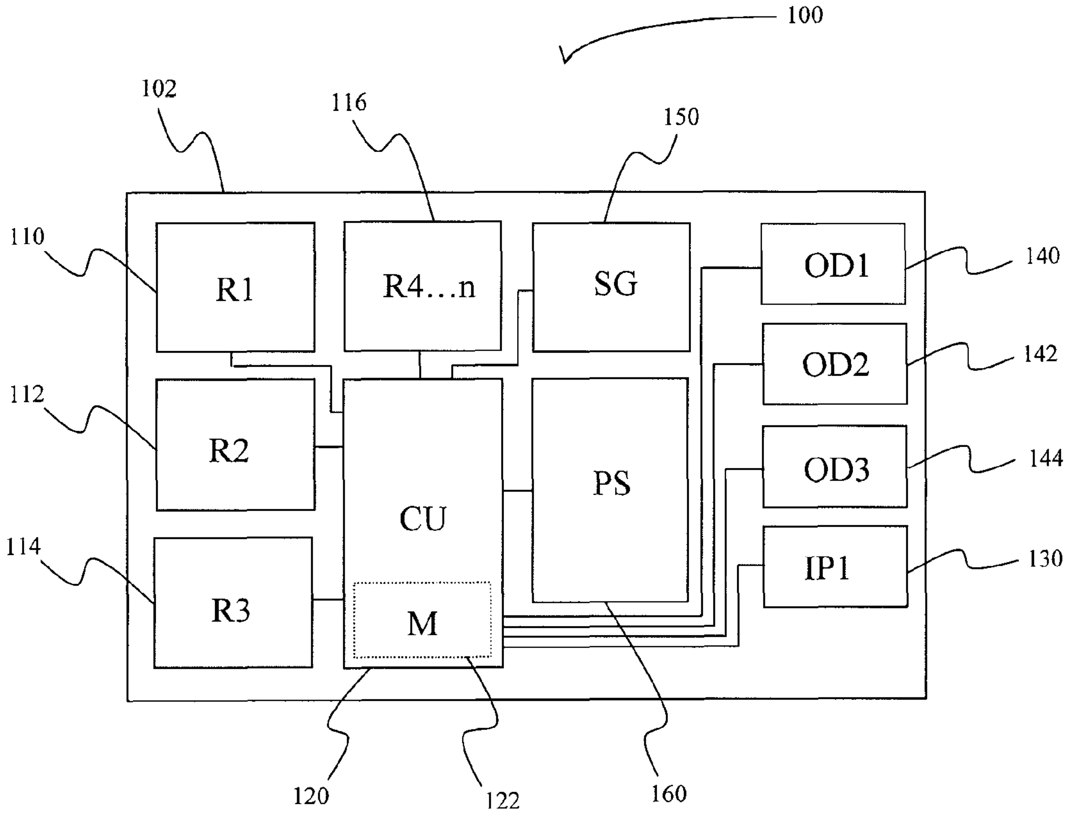
100
102
116
150
110
R1
R4…n
SG
OD1
140
OD2
142
112
R2
CU
PS
OD3
144
114
R3
M
IP1
130
120
122
160

ADVANCED ALERT, NOTIFICATION, AND RESPONSE DEVICE

This application is a divisional application of allowed U.S. Ser. No. 12/090,393, filed Apr. 16, 2008, which is a national phase application of PCT/US05/37659, which was filed 18 Oct. 2005.

FIELD OF THE INVENTION

The field of the invention is devices and methods for alert notification and response to same.

BACKGROUND OF THE INVENTION

Expedient notification of first responders and the public is often crucial to help avoid catastrophic loss of property and life, and there are many alert notification systems known in the art. For example, the National Oceanic and Atmospheric Administration (NOAA) system is a nationwide available radio-based system over which diverse weather and other warnings are broadcast. Further examples for nationwide systems include the emergency alert system (EAS) that provides a broad spectrum of alerts and notifications. To avoid alerts to communities that are not affected by an emergency, numerous nationwide emergency signals are transmitted using the Specific Area Message Encoding (SAME), which will activate alert systems only in a community with matching SAME code.

Additionally, numerous individual communities have their own, emergency-specific warning systems for first responders and other members of the public. For example, first responders (and in some cases also civilians) in a community proximal to a weapons storage facility, chemical plant, or other potentially hazardous facility may have a local radio-based transmission system that will alert the first responders to an emergency or a drill. While local alert systems often provide various advantages over nationwide alert systems, numerous difficulties remain. For example, where multiple and distinct potential hazards are present that require multiple and overlapping first responder personnel, such first responders need to use multiple alert systems.

To overcome at least some of these problems, local alert systems can be employed that include a receiver that is configured to receive both, NOAA transmitted warnings and alerts transmitted using a local system (e.g., ONALERT™ by Warning Systems, Inc.). While such systems advantageously allow to monitor two distinct alert and notification systems, various problems remain. Among other things, any NOAA-based alert automatically overrides any local alert. Such override is especially problematic where NOAA transmits an alert with relatively low criticality while the local station transmits a high-priority alert. Still further, such systems are typically pre-programmed to the local communication path (e.g., radio transmission at a predetermined frequency band). Therefore, and especially where a first responder from a community using such a system travels to a different community using a distinct local system, the alert system will typically not be responsive in the new community.

More recently, certain NOAA alert systems have been described (see e.g., U.S. Pat. App. No. 2004/0048573) in which the alert receiver has a capability to update the alert receiver with respect to the receiver's position. These systems therefore allow a user to hear alerts that are specific to the area in which the user is present provided the alert is SAME encoded. However, such systems typically do not update the receiver with respect to availability of local alert frequencies.

Therefore, while numerous alert notification systems are known in the art, all or almost all of them suffer from one or more disadvantages. Thus, there is still a need to provide improved alert notification systems.

SUMMARY OF THE INVENTION

The present invention is directed to alert notification systems in which a receiver is configured to receive, preferably simultaneously, a plurality of emergency signals from at least two distinct communication paths, and to prioritize the emergency signals according to the geographic location of the receiver. In preferred devices, prioritization is predetermined by assigning a priority rank to at least one channel within a local communication path relative to at least one channel within a second, most typically statewide or nationwide available communication path.

In one aspect of the inventive subject matter, an alert and notification device includes a first receiver that is configured to receive a first emergency signal via a first communication path having a first plurality of channels, wherein the first communication path is accessible within a plurality of jurisdictions. A second receiver in the device is configured to receive a second emergency signal via a second communication path having a second plurality of channels, wherein the second communication path is accessible in at least one of the plurality of jurisdictions, wherein in each of the jurisdictions at least one (and more typically each) channel of the second plurality of channels has a predetermined priority rank relative to at least one (and more typically each) of the first plurality of channels. A third receiver in the device is configured to receive a position signal, and a control unit in the device is configured to (a) correlate the position signal with position of the device within one jurisdiction, (b) identify the priority rank of each channel of the second plurality of channels in that jurisdiction, and (c) control output of the first or second emergency signal to an output device based on the priority rank.

In preferred and typically mobile devices, the first communication path includes the NOAA or an EAS frequency band, and the first plurality of channels are frequencies selected from the group consisting of 162.400 MHz, 162.425 MHz, 162.450 MHz, 162.475 MHz, 162.500 MHz, 162.525 MHz, and 162.550 MHz. The second communication path may comprise an UHF frequency band, a VHF frequency band, a microwave frequency band, an IR frequency band, a cellular communication frequency band, a cable TV transmission system, an optical network system, and/or a high-speed digital data transmission system. Where desirable, contemplated devices (e.g., where the device is coupled to TV cable or computer to thereby receive the second emergency signal) may further include a signal generator that is configured to provide a feedback signal from a user to an operator in response to at least one of the first and second emergency signals.

Typically, the third receiver is configured to receive a signal from a global positioning satellite or from a digital TV transmitter, but manual entry devices are also deemed suitable as third receivers. Optionally, contemplated devices may also include an input port that is electronically coupled to the control unit, wherein the control unit is preferably configured to allow reprogramming of the device using the input port. Contemplated devices comprise one or more output devices to either provide an audible and/or visual signal, and/or to control operation of another device or system that is functionally coupled to the output device. While not necessary, contemplated devices may further include a portion that provides a non-emergency signal, and most preferably an entertainment signal (e.g., using a CD-player, a DVD player, an MP3 player, a cassette player, an AM radio, a FM radio, a short wave radio, and/or a two-way radio).

In another aspect of the inventive subject matter, an alert and notification device has a microprocessor that is programmed to prioritize at least one channel of a second communication path (e.g., UHF frequency band, VHF frequency band, microwave frequency band, IR frequency band, cellular communication frequency band, cable TV transmission system, optical network system, a high-speed digital data transmission system, etc.) relative to at least one channel or a first communication path (e.g., NOAA or an EAS frequency band), wherein prioritization is based on a positional signal, and wherein the microprocessor is further programmed to associate the positional signal with the presence of the device in a jurisdiction in which first and second communication paths are accessible. Positional signals are preferably provided by a manual entry device, a global positioning signal, and/or a digital TV signal. Where desirable, it is also contemplated that the microprocessor is programmed such that association of the positional signal with presence of the device in the jurisdiction is performed without user intervention.

Therefore, a method of providing an alert to a recipient will include a step of assigning in a plurality of jurisdictions each channel of a plurality of second channels in a second communication path a predetermined priority rank relative to a first plurality of channels of a first communication path. In another step, positional information of an alert and notification device is received and correlated with a position of the device in one of the plurality of jurisdictions. In yet another step, the positional information is used to determine the priority rank of each of the second channels in the one jurisdiction, and the recipient is alerted using the first or second channel based on the priority rank.

In such methods, it is further preferred that the step of assigning is performed by programming a control unit in a alert and notification device. Furthermore, it is contemplated that the device is configured such that the step of receiving positional information includes operation of a manual entry device, or use of a global positioning signal and/or a digital TV signal.

Various objects, features, aspects and advantages of the present invention will become more apparent from the drawing and the detailed description of preferred embodiments of the invention.

BRIEF DESCRIPTION OF THE DRAWING

FIG. 1 is a schematic of an exemplary device according to the inventive subject matter.

DETAILED DESCRIPTION

The inventors have discovered that alert and notification devices can be built that have the capability of receiving statewide or nationwide transmitted and/or accessible emergency signals and locally transmitted and/or accessible emergency signals from one or more jurisdictions. Contemplated devices are configured to automatically prioritize and provide emergency signals, wherein prioritization is based on geographic location of the device. Most preferably, the geographic location is automatically determined using a global positioning signal and/or a digital TV signal.

The term "emergency signal" as used herein refers to a signal that alerts a person to an actual or impending emergency, wherein such signal can be audible, visible, and/or electronic in a format suitable for activation of a device. For example, audible signals could be a siren tone, a voice announcement, or a bell, while visual signals include displayed messages, strobe or flashing lights. Contemplated electronic emergency signals especially include those that activate or deactivate alarm systems (e.g., sirens, highway message boards, text messaging, etc.), and public or private service systems (e.g., vents and intake ducts for air conditioning, utility pumps, etc.).

As also used herein, the term "communication path" refers to a communication format that has multiple channels. For example, contemplated communication paths include radio frequency bands, including NOAA frequency band, EAS frequency band, various UHF and/or VHF frequency bands, microwave and infrared frequency bands, frequency bands used for cellular communication, cable and/or satellite TV transmission systems, optical network systems, and/or high-speed digital data transmission systems.

As further used herein, the term "channel" refers to a specific modality within the communication path. For example, where the communication path is the NOAA frequency band, the channels within the NOAA communication path are selected frequencies (e.g., 162.400 MHz, 162.425 MHz, or 162.450 MHz) employed by NOAA to communicate the emergency signal. Similarly, where the communication path is a frequency band used for cellular communication (e.g., 824-849 MHz, 869-894 MHz, or 1850-1990 MHz), the channel may be a single frequency, or a spectrum of multiple frequencies (e.g., CDMA signal) within that communication path. Alternatively, dedicated emergency bands, including the 4.9 GHz band (4940-4990 MHz) will have numerous channels that are individually addressable. On the other hand, where the communication path is a TV network system, channels will correspond to the TV channels, or where the communication path comprises a high-speed (e.g., >10 kb/s) digital data transmission system, a channel may be a network address.

As still further used herein, the term "jurisdiction" refers to the geographic area of an alert community, wherein the term "alert community" refers to one or more emergency signal receivers and at least one emergency signal transmitter, and wherein the alert community is further characterized by a defined set of emergency responses in a locally restricted area (e.g., a county, city, municipality, etc.). For example, the jurisdiction of a city fire or police department is the area in which the department has authority to provide fire and/or emergency services. Similarly, the jurisdiction of a county public safety department is the area in which the department would alert a population and/or group of first responders to an incident in a chemical or nuclear power plant.

Most typically, contemplated an alert and notification devices will include a receiver that receives a first emergency signal via a first communication path having a first plurality of channels, wherein the first communication path is transmitted and accessible within a plurality of jurisdictions. Contemplated devices further include another receiver that receives a second emergency signal via a second communication path having a second plurality of channels, wherein the second communication path is transmitted and accessible in at least one of the plurality of jurisdictions (typically less than all of the jurisdictions), wherein in each of the jurisdictions at least one (and typically each) channel of the second plurality of channels has a predetermined priority rank relative to at least one (and typically each) of the first plurality of channels. Yet another receiver of the device is configured to receive a position signal. Contemplated devices further include a control unit that is configured to (a) correlate the position signal with position of the device within one particular jurisdiction, (b) identify the priority rank of at least one (and typically each) channel of the first and/or second plurality of channels in that jurisdiction, and (c) control output of the first or second emergency signal to an output device based on the priority rank.

One exemplary device 100 is depicted in FIG. 1 in which the device has a housing 102 that includes a plurality of receives R, a control unit CU, an optional signal generator SG, a power source PS, an optional input device ID, and a plurality of output devices OD. In the exemplary device 100, it is generally preferred that the first receiver 110 is configured to receive the NOAA frequency band having multiple channels (e.g., 162.400 MHz, 162.425 MHz, 162.450 MHz, 162.475 MHz, 162.500 MHz, 162.525 MHz, and 162.550 MHz), while the second receiver 112 is preferably configured to receive at least one channel in the VHF frequency band (typically 150-170 MHz) and/or at least one channel in the UHF band (typically 850-870 MHz). Additionally, or alternatively, the second receiver 112 may also be configured as two-way voice communication system, and may or may not include encoding/decoding capability. Third receiver 114 is preferably a GPS receiver that is configured to receive multiple satellite signals and has capability of calculating positional information based on the satellite signals. Where desirable, a fourth (fifth, sixth, . . . nth) receiver 116 may be included to accommodate reception of an emergency signal via high-speed data network system or other communication path. Thus, in such embodiments, the fourth receiver is configured as a (cable)modem that connects to a host computer on an intranet, local- or wide area network, and/or the Internet. Most preferably, all receivers are dedicated devices that operate independently and simultaneously. However, it is also contemplated that one receiver may receive signals from two or more communication channels (e.g., via scanning or multiplexing).

In further preferred aspects of the exemplary device, at least two, and most typically all of the receivers are electronically coupled to the control unit 120, which optionally includes a memory 122. Control unit 120 is preferably configured to receive all signals from each of the receivers coupled to the control unit. However, the control unit 120 is programmed to allow output of an emergency signal of only one receiver at one time. In most preferred devices, the control unit will use a predetermined priority rank to decide which channel will be routed to the appropriate output device, and which channel(s) will be mooted. To that end, the control unit will use data stored in the memory 122 in which each location is associated with (a) available communication paths and communication channels in that location, and (b) a predetermined priority rank of at least one channel relative to another channel (which is most typically a channel of another communication path). Positional information for the location in such devices is preferably automatically obtained via third receiver 114.

Therefore, it should be recognized that contemplated devices not only have a capability of 'self-programming' to relevant communication paths and channels within a specific location, but also have the capability to automatically (i.e., without user intervention) discriminate alert notifications on the basis of a pre-assigned priority. For example, and especially where such a device is configured as a mobile device, a severe weather warning that is simultaneously broadcast over a NOAA channel will be overridden by a local emergency alert (e.g., chemical plant incident) transmitted over a high-priority channel in the VHF band, even if the device is taken from a location at which the device is normally used. Therefore, it should be appreciated that such devices can therefore be used not only in multiple locations, but also shared by several authorities in the same jurisdiction. Still further, it should be recognized that contemplated devices 'self-tune' to the relevant communication paths and channels without requiring a user to be privy to the communication paths and channels of a particular location.

Therefore, the inventors especially contemplate an alert and notification device that has a microprocessor that is programmed to prioritize at least one channel of a second communication path relative to at least one channel or a first communication path, wherein prioritization is based on a positional signal, wherein the microprocessor is further programmed to associate the positional signal with presence of the device in a jurisdiction in which first and second communication paths are accessible.

Most typically, programming of the control unit is provided by the supplier of the device. However, it should be noted that such programming may also be at least in part modified or replaced by the user community of such devices, and all known manners of reprogramming are deemed suitable for use herein. Particularly preferred reprogramming is performed using a USB port or other input device 130 to modify the data stored in the memory. In further preferred aspects, programming of the control unit will also include information (or an information database) of receivers that are actually or potentially coupled to the control unit. Such information will further preferably include instructions to tune the receiver into one or more channels of a given communication path. For example, where the second receiver is a UHF receiver and the third receiver provides a specific positional information, the control unit will determine (a) the location of the device, (b) the type of receivers coupled to the control unit, (c) available communication paths and channels at the location of the device, and (d) the priority pattern of each of the channels of the paths relative to each other. Most typically, the control unit will then use a set of preprogrammed instructions to tune the receivers to the available channels of the respective communication paths. Tuning may be static to one or more channels only, scanning over a plurality of channels, or may be multiplexed over multiple channels at the same time. Alternatively, multiple receivers may be employed for receiving multiple channels within the same communication path. Of course, where desired, manual override capability may be provided to override the priority channel with another channel in the same or different communication path.

In still further alternative aspects of the inventive subject matter, it is contemplated that the control unit may also be programmed to recognize a priority signal in an emergency signal that is received by one of the receivers using priority encoding similar to the header format of the SAME signal. Therefore, the need for a look-up table or other data structure in such devices that associates specific channels in a jurisdiction with a particular priority status may be omitted. Consequently, message formats are also contemplated that have a signal that is specific to a geographic area and that further has a signal that reflects a priority level. The control unit preferably comprises a common CPU (deterministic or non-deterministic), and may be configured as an embedded XP or other windows environment, or a self-contained PC or PLC to interpret various protocols assigned to it. Similarly, it should be appreciated that all other components (e.g., receivers, power source, signal generator, etc) are commercially available and may be employed without substantial modification.

The emergency signal is then routed to the appropriate output device 140, 142, and/or 142. In exemplary device 100, output device 140 is a flashing light LED, output device 142 is a speaker, and output device 144 is a display. Where desired, receipt of the signal can then be acknowledged by the recipient using signal generator 150. In preferred devices, the signal generator is a keyboard or other manual input device that cooperates with a receiver to send a response signal (e.g., via Internet, telephone network, cell phone network, etc.). The power source 160 is preferably a rechargeable battery or other uninterruptible power supply, which may be charged by an A/C adapter. Of course, it should be recognized that more than three output devices, and/or more than one signal generator may be included in contemplated devices.

In alternative aspects of the inventive subject matter, it should be recognized that the first communication path may vary considerably, and that all known communication paths are deemed suitable for use herein. However, it is generally preferred that the first communication path is transmitted and/or available in more than one jurisdiction, and most preferably at least transmitted and/or available on a statewide or even nationwide basis. Therefore, and among other first communication paths, contemplated paths include the EAS frequency band, coastguard frequency band, FEMA frequency band, etc. Depending on the particular communication path, it should be appreciated that the channel may therefore vary considerably, and all available channels (simultaneously or individually) within a path are contemplated herein.

Similarly, the second communication path may vary considerably, and contemplated devices may have multiple receivers that are configured to receive emergency signals from multiple channels of typically distinct paths. Especially preferred second communication paths include the UHF frequency band, the VHF frequency band, the microwave frequency band, the IR frequency band, cellular communication frequency bands, cable TV transmission systems, optical network systems, and/or a high-speed digital data transmission systems. Consequently, the particular nature of the channel will vary and all channels associated with the above paths are deemed suitable for use herein. For example, contemplated channels include one or more select frequencies within one or more radiofrequency bands, one or more channels in a TV transmission system, and/or one or more network addresses in a optical or digital high-speed data transmission system.

Where contemplated devices are coupled to TV, optical, or digital transmission system, it is especially preferred that the device may also include a signal generator that allows the recipient of the emergency signal to reply in an emergency specific manner. For example, where the second communication path is a digital high-speed data transmission system, the recipient may reply to the sender via Internet with availability of the first responder, estimated response time, or other information in response to the first and/or second emergency signals. In alternative aspects, and especially where the receiver also includes a transmitter (e.g., where the receiver is based on a ham-radio or cellular phone), the signal generator may be omitted. Similarly, where the device is coupled to a networked computer, the signal generator may be soft- and/or hardware located in or coupled to the computer.

With respect to the third receiver it is generally contemplated that the third receiver is configured to receive a signal that allows correlation of the signal or multiple signal from distinct locations with the position of the device. For example, suitable third receivers include those found in global positioning systems, systems that receive signals from a digital TV transmitter, systems that receive signals from a cellular communication tower, etc. Alternatively, the third receiver may also be a manual input device that provides positional information. For example, such manual input devices may include a keypad that is used to enter a telephone area code or a ZIP code. In yet another example, and especially where an alphanumeric input device is present, city or county names may be entered. Alternatively, a GUI-based input device may guide a user to determine the particular location. In still further contemplated aspects, the third receiver may also be an external device (e.g., hand-held GPS) that is electronically coupled to the contemplated alert devices.

Therefore, it should be recognized that the devices according to the inventive subject matter may also include one or more input ports that are electronically coupled to the control unit. In such devices, the input port may be used to provide positional information for the device, or information from an external receiver. Furthermore, and especially where a jurisdiction upgrades or changes a communication system, an input port may also be used to allow reprogramming of the device via the control unit.

Contemplated output devices may have numerous formats and it is generally preferred that the output device provides at least an audible and/or visible signal or notification. For example, suitable output devices with visible signal include strobe lights, LEDs or other continuous light emitters, displays (which may be interactive or passive), while suitable output devices with audible signal include beepers, horns, speakers, etc. Thus, the nature of contemplated emergency signals will range from simple tones and flashing lights, to more complex messages, including pre-recorded voice messages, displayed text and/or visual messages and combinations thereof (e.g., to repeat or provide emergency specific information or instructions). In still further contemplated aspects, the output device may also be an active control device that controls and/or initiates operation of an electronic device that is coupled to the active output device. For example, suitable active output devices may be as simple as a USB or RS323 port, or more complex such as a device driver for a phone dialer, a highway message board, etc.

While it is generally preferred that contemplated alert devices will be dedicated to the alert and/or response function, it should also be appreciated that the devices according to the inventive subject matter may include at least one of a CD-player, a DVD player, an MP3 player, a cassette player, an AM radio, a FM radio, a short wave radio, and a two-way radio. Therefore, contemplated devices will provide not only an emergency signal, but may also provide an entertainment signal.

In still another aspect of the inventive subject matter, the inventors also contemplate a method of providing an alert system to a recipient having a step of assigning in a plurality of jurisdictions each channel of a plurality of second channels in a second communication path a predetermined priority rank relative to a first plurality of channels of a first communication path. In another step, a device is configured to allow receiving positional information of an alert and notification device, and to further allow correlating the positional information with a position of the device in one of the plurality of jurisdictions. In yet another step, the device is configured to allow using the positional information to determine the priority rank of each of the second channels in the one jurisdiction; and the device is further configured to allow alerting the recipient using the first or second channel based on the priority rank.

Most typically, the step of assigning is performed by programming a control unit in an alert and notification device, wherein the programming is either performed at the manufacture of the device, upon delivery of the device by a user using software to program the device, or wherein programming is performed using one or more of the receivers.

Thus, specific embodiments and applications of advanced alert, notification, and response devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A mobile alert and notification device, comprising:

a first receiver that is configured to receive a first emergency signal via a first communication path selected from the group consisting of an NOAA frequency band, an EAS frequency band, an UHF frequency band, and VHF frequency band, a cellular communication frequency band, a high-speed digital transmission system, and a microwave frequency band, and wherein the first communication path has a first plurality of channels and is accessible within a plurality of jurisdictions;

a second receiver that is configured to receive a second emergency signal via a second communication path selected from the group consisting of a high-speed digital transmission system and a cellular communication frequency band, wherein the second communication path has a second plurality of channels and is accessible in at least one of the plurality of jurisdictions;

wherein in each of the at least one jurisdictions each channel of the second plurality of channels has a predetermined priority rank relative to the first plurality of channels;

a third receiver that is configured to receive a position signal;

a control unit that is configured to (a) correlate the position signal with position of the device within one jurisdiction of the plurality of jurisdictions, (b) identify the priority rank of each channel of the second plurality of channels in the one jurisdiction, and (c) control output of the first or second emergency signal to an output device based on the priority rank;

wherein the device is configured to allow prioritization of the first and second emergency signals without user intervention based on the position signal.

2. The device of claim 1 wherein the device further comprises a signal generator that is configured to allow providing of information from a user of the device to an operator in response to at least one of the first and second emergency signals.

3. The device of claim 1 wherein the device further comprises a signal generator that is configured to allow two-way communication between a user of the device and an operator in response to at least one of the first and second emergency signals.

4. The device of claim 1 wherein at least one of the first and second receiver is configured to connect to a host computer on at least one of an intranet, a local area network, a wide area network, and the Internet.

5. The device of claim 1 further comprising an input port that is electronically coupled to the control unit, and wherein the control unit is configured to allow reprogramming of the device using the input port.

6. The device of claim 1, wherein the device is coupled to a computer to thereby receive the second emergency signal.

7. The device of claim 1 wherein the output device is at least one of a speaker and a display.

8. The device of claim 1 wherein the device is configured as a mobile phone.

9. The device of claim 1 wherein the third receiver is configured to receive a signal from a global positioning satellite or from a digital TV transmitter.

10. A mobile alert and notification device, comprising:

a first receiver that is configured to receive a first emergency signal via a first communication path selected from the group consisting of a cellular communication frequency band, and a high-speed digital transmission system, and wherein the first communication path has a first plurality of channels and is accessible within a plurality of jurisdictions;

a second receiver that is configured to receive a second emergency signal via a second communication path selected from the group consisting of the cellular communication frequency band, and the high-speed digital transmission system, wherein the second communication path has a second plurality of channels and is accessible in at least one of the plurality of jurisdictions;

wherein in each of the at least one jurisdictions each channel of the second plurality of channels has a predetermined priority rank relative to the first plurality of channels;

a third receiver that is configured to receive a position signal;

a control unit that is configured to (a) correlate the position signal with position of the device within one jurisdiction of the plurality of jurisdictions, (b) identify the priority rank of each channel of the second plurality of channels in the one jurisdiction, and (c) control output of the first or second emergency signal to an output device based on the priority rank;

wherein the device is configured to allow prioritization of the first and second emergency signals without user intervention based on the position signal; and a signal generator that is configured to allow providing of information from a user of the device to an operator in response to at least one of the first and second emergency signals.

11. The mobile alert and notification device of claim 10 wherein the signal generator is implemented as software.

12. The mobile alert and notification device of claim 10 wherein the signal generator is configured to allow two-way communication between a user of the device and an operator in response to at least one of the first and second emergency signals.

13. The mobile alert and notification device of claim 10 wherein at least one of the first and second receiver is configured to connect to a host computer on at least one of an intranet, a local area network, a wide area network, and the Internet.

14. The mobile alert and notification device of claim 10 further comprising an input port that is electronically coupled to the control unit, and wherein the control unit is configured to allow reprogramming of the device using the input port.

15. The mobile alert and notification device of claim 10 further comprising an output device that is configured to allow providing of at least one of an audible signal or notification and a visible signal or notification.

16. The mobile alert and notification device of claim 10 wherein the third receiver is configured to receive a signal from a global positioning satellite or from a digital TV transmitter.

* * * * *